Inventor.
Andres Weissfloch.

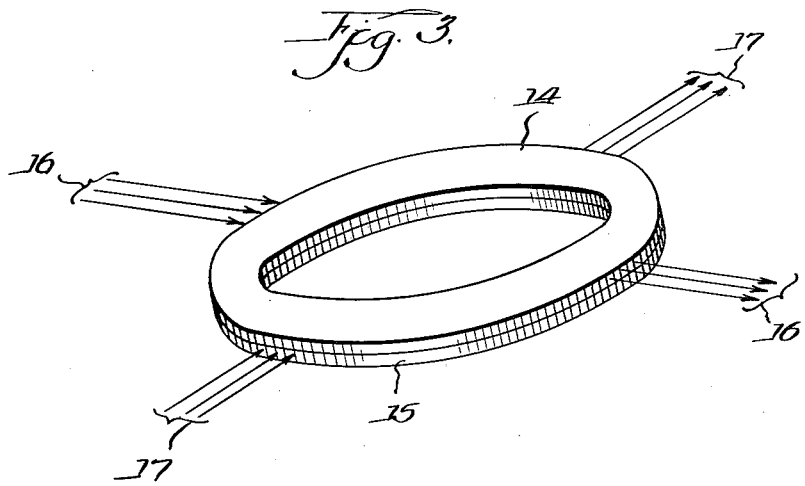
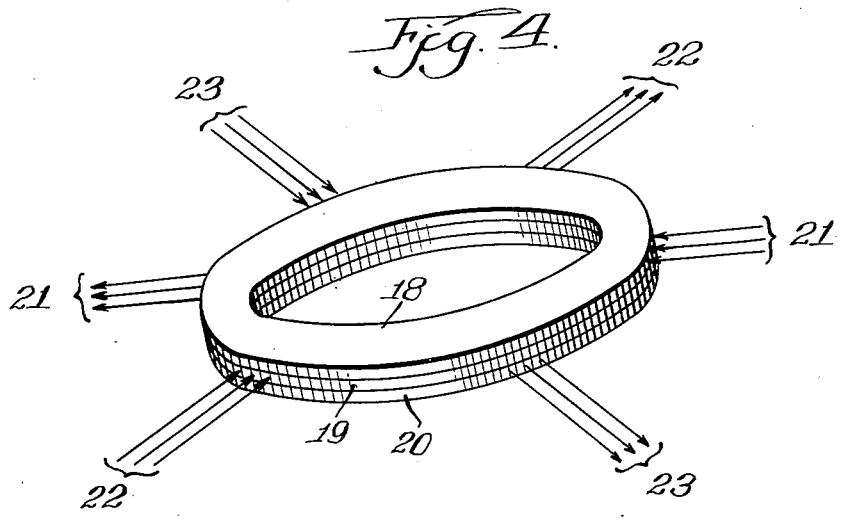

United States Patent Office 3,042,992
Patented July 10, 1962

3,042,992
METHOD OF AND APPARATUS FOR MAKING TENSIONED WIRE GRID ELECTRODE
Andreas Weissfloch, Munich, Germany, assignor to Siemens & Halske Aktiengesellschaft, Munich, Germany, a corporation of Germany
Filed Mar. 22, 1955, Ser. No. 495,839
Claims priority, application Germany Mar. 25, 1954
3 Claims. (Cl. 29—25.14)

This invention is concerned with a method of and apparatus for making pretensioned grids for electron discharge tubes and with a grid electrode produced thereby comprising a stable carrier for supporting the tensioned grid wires.

The carrier which supports the grid wires in tensioned condition may be substantially rectangular and may have a plane or domed surface. The invention is however likewise applicable to tensioned grids comprising annular tensioning frames. The invention is furthermore applicable to tensioned grids having single rows of parallel wires and also to grids having crossed wires or wires mesh structures.

The problem underlying the invention is to provide a tensioned grid in which the tension on the wires is not at all or only negligibly reduced after securing the wires to the carrier and in which the tension on the wires may indeed increase after they are secured to the carrier.

According to the invention, the grid wires are held at points lying outside their effective grid surface. The carrier is pressed upon the wires with a definite contact pressure, deflecting the wires in a direction perpendicular to the axes thereof and thereby increasing the tension on the wires. The wires, while they are under such increased tension, are suitably secured or fastened to the carrier, for example, by soldering or welding. The carrier may be prior to securing the grid wires thereto provided or connected with supporting or carrying or terminal elements, or with other tube elements which will be adjacent to the tensioned grid after it is put in place in an associated tube. The pressure put on the grid wires incident to the soldering or otherwise fastening them on the carrier may be supplied by a spring or a weight or the like.

The soldering or welding of the wires is suitably effected in a vacuum or in a protective atmosphere. If soldering is used, the solder may be applied to the desired points in the form of foil or wire means or in the form of an annulus. It is also possible to prepare for the soldering by providing a solder layer galvanically or in other desired manner.

The above noted and other objects and features of the invention will appear from the description which will be rendered below with reference to the accompanying diagrammatic drawings. In these drawings, FIG. 1 shows an example of a device for producing tensioned wire grids according to the invention wherein the wires are fastened directly to the carrier therefor;

FIG. 3 shows an example of a grid carrier made according to the invention of a plurality of parts; and FIG. 4 shows an example of a grid carrier made according to the invention involving three parts.

The drawings show only the parts required for the understanding of the invention. Identical reference numerals indicate like parts throughout the drawings.

Figure 1:
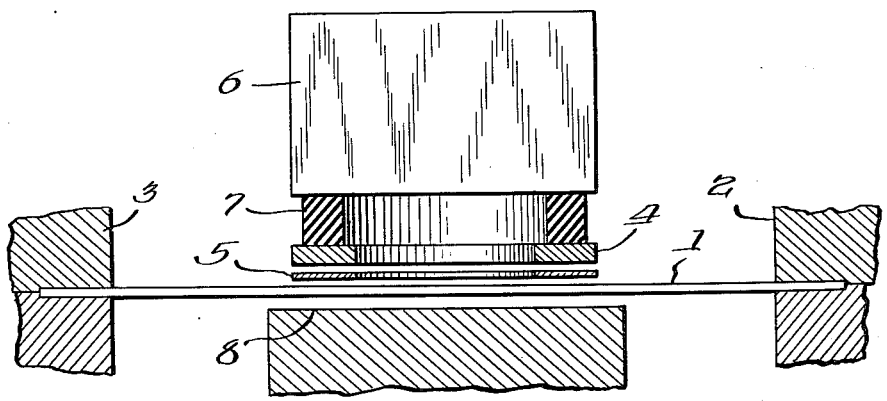

In FIG. 1, numerial 1 indicates the grid wires to be secured to the carrier 4 ready for assembly in a tube. The grid wires 1 may be disposed parallel to each other in a row, or there may be provided two or more layers of wires which cross at desired angles. The grid wires 1 may also form a mesh structure. The wires 1 are held under a relatively slight tension suitably applied thereto at the ends thereof by the clamping members 2 and 3 of a suitable holding device. The arrangement of the wires and the manner of holding them by clamping members 2, 3 may be similar in the embodiment shown in FIG. 2 in which like parts are indicated by like reference numerals.

The carrier 4 shown in FIG. 1 holds the wires in tensioned condition. If desired, an annular carrier such as 9 in FIG. 2, may be used which is connected with a supporting frame 10.

Figure 2:
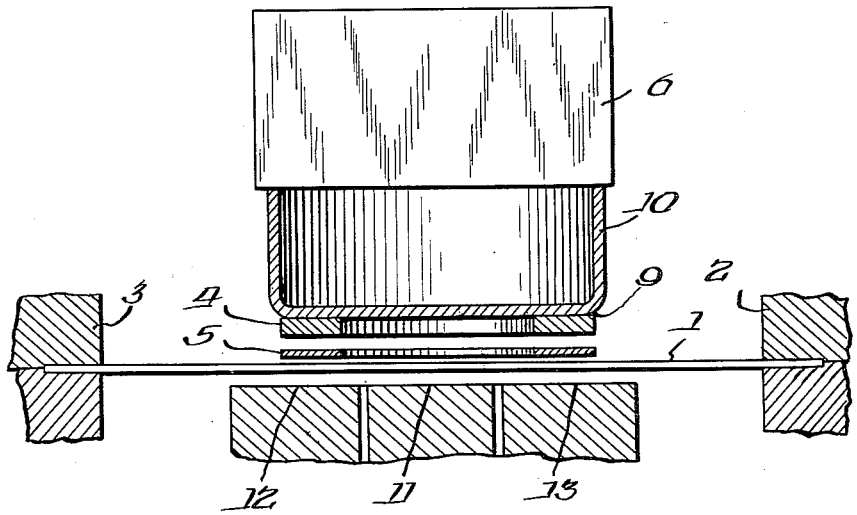
FIG. 2 shows an embodiment in which the wires are fastened to a carrier secured to a supporting frame member extending therefrom.

The use of a carrier as indicated in FIG. 2 at 9, made of a material whose thermal coefficient of expansion is as may be desired equal, higher or lower than that of the grid wires will make it possible to provide for further tensioning of the grid wires after fastening them thereto, by soldering or the like. A frame or carrier may, of course, be used which is made of a material having a coefficient of thermal expansion which is different from that of the wires.

It is assumed in the illustrated examples that the grids to be produced are grids of circular shape. The annular carrier member 9, shown in FIG. 2, may for accurate centering be connected with the supporting frame 10 by welding or soldering prior to securing the grid wires in place. The solder may be applied to the carrier 4 in FIG. 1 or, in the case of the structure according to FIG. 2, to the carrier or, in either case, to the grid wires in the form an annular solder foil 5 or the like.

The soldering of the wires to the carrier may be effected in a vacuum or in a protective atmosphere. It is clear, of course, that a suitable casing or housing must be provided for the apparatus shown so as to carry out the soldering in a vacuum or in a suitable protective atmosphere. Any suitable and desired known means may be employed for this purpose and such means has therefore not been illustrated to keep the drawings simple. During the soldering, the grid wires are held at points outside their effective grid areas, as shown, at their ends, so as to secure them slightly tensioned in definite positions. The carrier to be soldered to the wires is pressed thereagainst by the weight 6 acting plungerlike thereon, in the example shown in FIG. 1, through the medium of the insulating ring 7. The pressure exerted in this manner tends to deflect the wires downwardly, as seen in the drawing, thereby increasing the tension on the wires. On the opposite side, spaced from the tensioned somewhat downwardly deflected wires and out of engagement therewith, is disposed a suitable heating source 8 which supplies the required heat to the soldering areas by radiation. Known and suitable current supply means may of course be provided in accordance with commonly known practice.

In the embodiment shown in FIG. 2, the weight 6 acts plungerlike directly upon the frame 10 and through the associated carrier member 9 upon the solder foil 5 which is pressed against the wires 1, effecting tensioning thereof as described in connection with FIG. 1. The heating source may be subdivided to form two or more sections 11, 12, 13. Suitable known means (not shown) may be provided for independently supplying current to these sections and to disconnect current therefrom so as to provide differential heating for the soldering areas and for the grid wires, respectively. A similar heating arrangement may of course be used in FIG. 1. The pressure supplied by the weight 6 or the like may be controlled as desired, and the radiant heat supplied for the soldering may likewise be controlled as desired. It is accordingly by proper pressure and temperature control possible to provide the desired tension on the wires with a high degree of accuracy.

In order to maintain the high degree of accuracy so far as the tension on the wires is concerned, it is necessary to use a carrier exhibiting high mechanical stability. There are grids known comprising an annular frame having grid wires which are soldered thereto on one side thereof. It has been attempted to improve such grids by providing on each side of the grid wires a tensioning element. Such structures may be made relatively stable without appreciably increasing the thickness of the parts.

However, carriers of the known kind do not have the stability required in many cases so as to maintain the tension on the wires, especially during the operation of the structures. The invention overcomes this drawback.

Another feature and object of the invention relates, accordingly to the provision of an improved composite tensioning carrier comprising at least two annular parts. These parts are so disposed that the grain resulting from the rolling operation of the original material in one part lies substantially perpendicular to the general direction of the grain produced in the rolling operation in the other part. Detrimental warping of the annular carrier composed of the two parts is thus avoided, resulting in great structural stability.

Instead of using two carrier parts mutually angularly displaced as indicated above, a structure built up similar to laminated wood may be employed providing a plurality of frame parts with their grain directions produced in rolling mutually displaced at predetermined angles. It is in such embodiment not absolutely necessary to displace the parts with their grain extending at 90° one to the other. In the case of using three-ply structures, that is, three frame or carrier parts, a grain displacement of 60° may produce particular advantages. A frame comprising an odd number of parts would be particularly suitable for carrying grid wires on both sides thereof. It is on the other hand of advantage to use an even number of frame parts whenever it is desired to provide grid wires only in one plane and it is in such structures recommended to use on each side of the grid wires symmetrically the same number of frame parts.

FIG. 3 shows in simplified perspective an example of a carrier for an annular grid to illustrate the features explained above. The carrier comprises two parts 14 and 15. The grain produced in the rolling of the original material of part 14 extends in the direction of the arrows 16 while the corresponding grain of the part 15 extends in the direction of the arrows 17, that is, perpendicular to the direction 16. The grid wires which have not been shown to keep the drawing simple, are disposed between these annular parts 14 and 15 and fastened thereto in a manner described before. A suitable support may in such case be provided for holding the bottom frame part 15 in desired position.

FIG. 4 shows in simplified perspective an example of a carrier for an annular grid illustrating the use of an odd number of parts, 18, 19 and 20. The grain produced in the rolling of the original material of part 18 extends in the direction of the arrows 21, while the corresponding grains of the parts 19 and 20 extend in the direction of the respective arrows 22 and 23. In such case, as illustrated, the directions of the respective grains are symmetrically disposed. The supporting structure may be suitably constructed to hold the parts in desired position.

Changes may be made within the scope and spirit of the appended claims.

I claim:

1. A method of making a grid for an electron discharge tube including an annular relatively rigid metallic carrier and grid wires soldered thereto and extending across the central opening thereof, which comprises taking rectilinear wires which are to form said grid wires and applying forces at the ends thereof to impart relatively slight initial tension thereto, placing an annulus of solder against one surface of each of said slightly tensioned wires, placing a relatively rigid annular metallic carrier adjacent said solder annulus and concentric therewith, applying pressure to one side only of said carrier remote from said solder annulus in a direction perpendicular to the axes of said slightly tensioned wires and in spaced relationship with respect to said carrier to press said solder annulus against said wires and deflect such wires, thereby increasing the tension thereon beyond the slight initial tension imparted thereto by said forces applied at the ends thereof, and applying radiant heat to said wires at the opposite upsupported surface thereof for the purpose of melting said solder so as to effect the soldering of said carrier to said wires while said wires are under increased tension by the pressure applied to said carrier.

2. A method according to claim 1, comprising applying radiant heat of different magnitude to different areas of said wires.

3. A method according to claim 1, comprising applying pressure to a supporting frame connected with said carrier for propagation to such carrier, said supporting frame having a coefficient of thermal expansion which is different from that of said wires.

References Cited in the file of this patent

UNITED STATES PATENTS

| | | |
|---|---|---|
| 2,446,271 | Eitel | Aug. 3, 1948 |
| 2,451,360 | Skehan | Oct. 12, 1948 |
| 2,461,303 | Watson | Feb. 8, 1949 |
| 2,500,355 | Haas | Mar. 4, 1950 |
| 2,503,806 | Diggle | Apr. 11, 1950 |
| 2,527,127 | Gormley et al. | Oct. 24, 1950 |
| 2,610,387 | Borland et al. | Sept. 16, 1952 |

FOREIGN PATENTS

| | | |
|---|---|---|
| 600,257 | Great Britain | Apr. 5, 1948 |